(12) United States Patent
Karlsson

(10) Patent No.: US 12,187,260 B2
(45) Date of Patent: Jan. 7, 2025

(54) METHOD FOR CONTROLLING AN INTERNAL COMBUSTION ENGINE SYSTEM

(71) Applicant: VOLVO TRUCK CORPORATION, Gothenburg (SE)

(72) Inventor: Johan Karlsson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/601,048

(22) Filed: Mar. 11, 2024

(65) Prior Publication Data

US 2024/0317204 A1 Sep. 26, 2024

(30) Foreign Application Priority Data

Mar. 20, 2023 (EP) ..................................... 23162979

(51) Int. Cl.
*B60W 10/06* (2006.01)
*B60W 10/10* (2012.01)
(Continued)

(52) U.S. Cl.
CPC ............ *B60W 10/06* (2013.01); *B60W 10/10* (2013.01); *B60W 30/188* (2013.01);
(Continued)

(58) Field of Classification Search
CPC ...... B60W 10/06; B60W 10/10; B60W 10/11; B60W 30/188; B60W 50/097;
(Continued)

(56) References Cited

U.S. PATENT DOCUMENTS

2011/0045948 A1 2/2011 Doering et al.
2018/0298833 A1* 10/2018 Brischetto ........... F02D 41/0007
(Continued)

FOREIGN PATENT DOCUMENTS

DE 102017005412 A1 12/2017
EP 3377381 A1 9/2018
(Continued)

OTHER PUBLICATIONS

English translation of JP2010210042A; http://translationportal.epo.org; Jul. 24, 2024 (Year: 2024).*
(Continued)

*Primary Examiner* — Roger L Pang
(74) *Attorney, Agent, or Firm* — Venable LLP; Jeffri A. Kaminski

(57) ABSTRACT

A method for controlling an internal combustion engine system so as to avoid turbo surge and/or shorten power cut off during gearshift is provided. The internal combustion engine system includes: an internal combustion engine and a gearbox operatively connected to the internal combustion engine; a turbocharging arrangement configured to provide a boost pressure of air fed to the internal combustion engine; and a control system configured to control operation of the internal combustion engine system, the method comprising: providing information about a point of time for initiating an upcoming gearshift, a target engine speed after the upcoming gearshift, iii) a target engine torque after the upcoming gearshift, and current operation conditions of the internal combustion engine system; determining, based on said information and before the upcoming gearshift is initiated, whether there is a risk of having turbo surge during the upcoming gearshift; and, if such a risk is determined, lowering the boost pressure before initiating the upcoming gearshift.

16 Claims, 3 Drawing Sheets

(51) Int. Cl.
*B60W 30/188* (2012.01)
*B60W 50/00* (2006.01)

(52) U.S. Cl.
CPC . *B60W 50/0097* (2013.01); *B60W 2510/0633* (2013.01); *B60W 2510/0638* (2013.01); *B60W 2510/0657* (2013.01); *B60W 2510/104* (2013.01); *B60W 2710/0638* (2013.01); *B60W 2710/0644* (2013.01); *B60W 2710/0666* (2013.01); *B60W 2710/1005* (2013.01)

(58) Field of Classification Search
CPC ............... B60W 30/19; B60W 30/184; B60W 30/1882; B60W 2510/104; B60W 2510/0638; B60W 2510/0657; B60W 2510/0633; B60W 2710/1005; B60W 2710/0644; B60W 2710/0666; B60W 2710/0638
USPC .................................... 701/54; 477/107, 110
See application file for complete search history.

(56) References Cited

U.S. PATENT DOCUMENTS

2020/0240424 A1\* 7/2020 Vijayakumar .......... F02B 37/22
2021/0071602 A1 3/2021 Tufail et al.

FOREIGN PATENT DOCUMENTS

| JP | 2010210042 A | 9/2010 |
| KR | 101846723 B1 | 4/2018 |
| SE | 1650875 A1 | 12/2017 |
| WO | 2017086873 A1 | 5/2017 |

OTHER PUBLICATIONS

Extended European Search Report in corresponding European Application No. 23162979.1 dated Sep. 15, 2023 (7 pages).

\* cited by examiner

METHOD FOR CONTROLLING AN INTERNAL COMBUSTION ENGINE SYSTEM

TECHNICAL FIELD

The disclosure relates generally to internal combustion engine systems. In particular aspects, the disclosure relates to a method for controlling an internal combustion engine system so as to avoid turbo surge and/or shorten power cut off during gearshift. The disclosure can be applied in heavy-duty vehicles, such as trucks, buses, and construction equipment. Although the disclosure may be described with respect to a particular vehicle, the disclosure is not restricted to any particular vehicle.

BACKGROUND

Internal combustion engine systems of trucks and other heavy vehicles are often provided with a turbocharge system where intake air is compressed (to a "boost pressure") in a compressor driven by a turbine that in turn is driven by exhaust gas. Such an engine system may be subject to "turbo surge", i.e. mass flow pulsations over the turbo compressor. Turbo surge may typically arise when suddenly and significantly releasing the accelerator pedal while operating the engine with high torque/load, relatively high engine speed (rpm) and a high boost pressure. Another cause of turbo surge is gear-shifting, typically when quickly switching one or two steps to a higher gear where the target engine speed is lower than before the gear shift.

Turbo surge generates an unpleasant sound and repeated turbo surge events may damage the turbocharge arrangement, and there is thus a desire to avoid turbo surge.

A so-called compressor map shows what pressure and flow relationships can be used for a certain compressor; a surge line in the compressor map may delimit a region where the conditions are such that turbo surge will occur. If the compressor is operated under conditions close to the surge line there is a considerable risk that turbo surge will occur if the flow is disturbed, such as when releasing the accelerator pedal or shifting gear.

Various methods have been presented for avoiding turbo surge in vehicle internal engine combustion systems. One example is to control the engine torque and speed during gear shift and try to reduce boost pressure as much as possible during the ramp down of the torque and speed when the process of shifting gear has started. SE1650875A1 discloses a method where a certain torque reduction rate is selected based on e.g. engine torque and speed before initiating torque reduction, followed by detecting any surge event during torque reduction and, if so, adapting the torque reduction rate.

Although the known methods may be suitable in many situations there is still a need for improvements in the field of turbo surge prevention for vehicle internal engine combustion systems.

SUMMARY

According to a first aspect of the disclosure, the disclosure relates to a method for controlling an internal combustion engine system so as to avoid turbo surge and/or shorten power cut off during gearshift, wherein the internal combustion engine system comprises:

an internal combustion engine and a gearbox operatively connected to the internal combustion engine;

a turbocharging arrangement configured to provide a boost pressure of air fed to the internal combustion engine; and a control system configured to control operation of the internal combustion engine system, the method comprising:

providing information about i) a point of time for initiating an upcoming gearshift, ii) a target engine speed after the upcoming gearshift, iii) a target engine torque after the upcoming gearshift, and iv) current operation conditions of the internal combustion engine system;

determining, based on said information and before the upcoming gearshift is initiated, whether there is a risk of having turbo surge during the upcoming gearshift; and, if such a risk is determined, lowering the boost pressure before initiating the upcoming gearshift.

Thus, already before initiating the upcoming gearshift, i.e. before torque ramp down, it is determined whether there is a risk that the upcoming gearshift results in turbo surge given the current and target operating conditions. And if so, the boost pressure is lowered already before initiating the gearshift so that the turbo surge risk is eliminated or at least reduced. This proactive approach of handling the risk of turbo surge is in clear contrast to reactive methods where actions are taken only when a surge event has been detected.

Besides avoiding turbo surge, the method of this disclosure has the advantageous effect of allowing for a faster change of engine torque and speed and thus a shorter power cut off time during gearshift compared to conventional methods. It also allows keeping the boost pressure at a higher level during gearshift resulting in a faster torque increase after the shift.

The control system for controlling operation of the engine system may comprise one or more control units or control circuits arranged to receive and send information from/to each other, sensors, actuators, etc., further being arranged to make calculations, look up values in tables, etc. Such control systems are well known as such.

Information about the point of time for initiating the upcoming gearshift may be provided by a gearbox control circuitry, or a central control system, that may be configured to continuously calculate which gear to use to minimize fuel consumption based on e.g. current engine operating conditions, current gear, desired speed, road inclination and road map data. That way it can be determined the point of time for initiating the next gearshift, the time left to the next gearshift, which gear to select etc. This information may be sent to an engine control circuitry. As an example, the gearbox control circuitry determines at a certain point in time that a gear should be shifted within some time period. This time period could be "as soon as possible" leading to some minimum time period depending on the delay of the specific engine and transmission system used, or a certain set time period, such as a few seconds. The time period can also be longer, for instance, if it is known from road map data that the road inclination will change after a certain time period with the current vehicle speed. In any case, this sets the point of time for reducing the torque and initiating the upcoming gearshift. Information about this point of time may be sent immediately to the engine control circuitry that evaluates the information and takes action, including reducing the boost pressure slightly before the upcoming gearshift if needed to avoid risk for turbo surge.

Information about target engine speed and torque after the upcoming gearshift may be provided in a similar way as the point of time for initiating the upcoming gearshift. For instance, to keep the desired speed after the gearshift with the same road inclination etc., it can be calculated the speed and torque required for the transmission ratio associated with the gear to be shifted to.

As to the current operation conditions of the internal combustion engine system, an engine control system normally has a lot of information about the current operation conditions. Conditions that are of interest for gearshift and turbo surge include current boost pressure, current engine speed and current engine torque. The rate of decrease and increase of engine torque and engine speed at the upcoming gearshift may also be of interest.

The determination of whether there is a risk of having turbo surge during the upcoming gearshift may be carried out in different ways. In one example one makes use of operation models and sensors to calculate pressure and flow conditions over the compressor in the turbocharging arrangement. The risk for turbo surge is then obtained from the compressor map: if the current conditions corresponds to a point in the compressor map that is close to a surge line, e.g. closer to the surge line than a certain threshold distance, it can be determined that there is a risk for turbo surge.

In another example one may use the fact that the risk for turbo surge normally is largest when engine torque or speed is varied quickly and the boost pressure is high. One may then set criteria/thresholds for torque and speed change rate as well as for boost pressure, and if these thresholds, or a criteria based on combined thresholds, are/is (to be) exceeded during the upcoming gearshift (in particular during the initial part of the gearshift when the torque is reduced) it can be determined that there is a risk for turbo surge.

In a further example one may focus on gearshifts and set an upper limit for the boost pressure to be allowed for switching gears. If the current boost pressure exceeds the upper limit it can be determined that there is a risk for turbo surge. A first upper limit can be used if the upcoming gearshift is only one step. A second upper limit can be set if the upcoming gear shift involves two gear steps.

If a risk for turbo charge is determined, the response is to lower the boost pressure of the engine system before initiating the upcoming gearshift, i.e. before starting to reduce the engine torque/load (before torque ramp down). Lowering the boost pressure can be done by activating various air and gas actuators of the engine system to increase the air/gas flow through the engine as quickly as possible. Examples of such actuators are wastegate, VGT (variable-geometry turbocharger), EGR (exhaust gas recirculation) valve, ITV (intake throttle valve) and variable intake/exhaust valve opening.

In a typical application the internal combustion engine system is arranged onto a vehicle for propulsion of the vehicle.

In some examples, providing information about the point of time for initiating the upcoming gearshift comprises: determining that a gearshift is desired, and providing the point of time for initiating the upcoming gearshift based on a point in time when it was determined that a gearshift is desired.

In some examples, the method comprises determining which gear to use to minimize fuel consumption after the upcoming gearshift based on current conditions and a target speed of a vehicle onto which the internal combustion engine system is arranged.

In some examples, the method comprises: determining the target engine speed and the target engine torque based on a target speed of a vehicle onto which the internal combustion engine system is arranged and on a transmission ratio of the gear to be shifted to in the upcoming gearshift.

In some examples, the current operation conditions of the internal combustion engine system comprises at least one of the following: current boost pressure, current engine speed and current engine torque.

In some examples, the current operation conditions of the internal combustion engine system comprises the current boost pressure.

In some examples, determining whether there is a risk of having turbo surge during the upcoming gearshift comprises: determining current pressure and flow conditions over the compressor in the turbocharging arrangement; and comparing whether a position in a compressor map corresponding to the current pressure and flow conditions over the compressor is closer to a surge line in the compressor map than a threshold value.

In some examples, determining whether there is a risk of having turbo surge during the upcoming gearshift comprises: providing a first threshold boost pressure for a given change rate of engine torque or engine speed during gearshift; or providing a second threshold boost pressure above which gearshift is not allowed; and determining whether a current boost pressure exceeds the first and/or second threshold boost pressure.

In some examples, lowering the boost pressure of the engine system before initiating the upcoming gearshift comprises: activating one or more air and gas actuators to increase the air/gas flow through the internal combustion engine system.

In some examples, the method comprises: initiating the upcoming gearshift and performing the upcoming gearshift.

According to a second aspect of the disclosure it relates to an internal combustion engine system comprising: an internal combustion engine and a gearbox operatively connected to the internal combustion engine; a turbocharging arrangement configured to provide a boost pressure of air fed to the internal combustion engine; and a control system configured to control operation of the internal combustion engine system, wherein the control system is configured to perform the method according to above.

According to a third aspect of the disclosure it relates to a vehicle comprising an internal combustion engine system according to above.

According to further aspects of the disclosure it relates to:
- a computer program product comprising program code for performing, when executed by the processor device, the method according to above;
- a control system comprising one or more control units configured to perform the method according to above; and
- a non-transitory computer-readable storage medium comprising instructions, which when executed by the processor device, cause the processor device to perform the method according to above.

The above aspects, accompanying claims, and/or examples disclosed herein above and later below may be suitably combined with each other as would be apparent to anyone of ordinary skill in the art Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
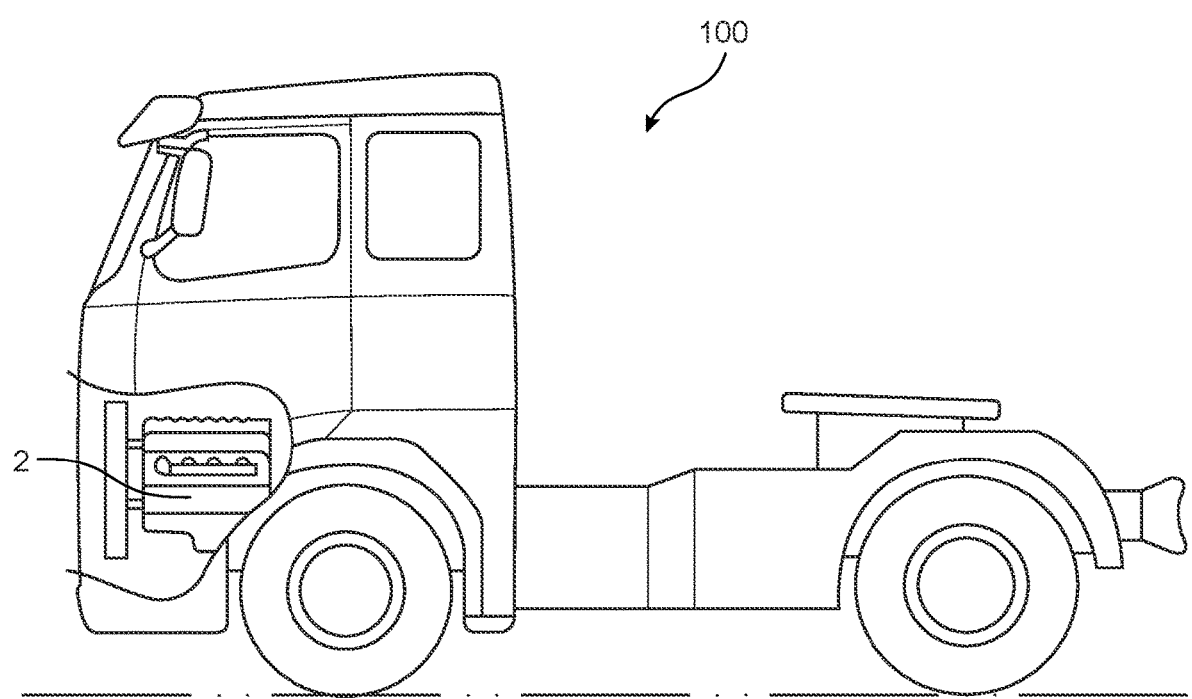
FIG. 1 shows a vehicle provided with an internal combustion engine system according to this disclosure.

FIG. 1 shows a vehicle in the form of a truck 100 provided with an internal combustion engine system according to this disclosure. FIG. 1 shows an internal combustion engine 2 forming part of the internal combustion engine system.

Figure 2:
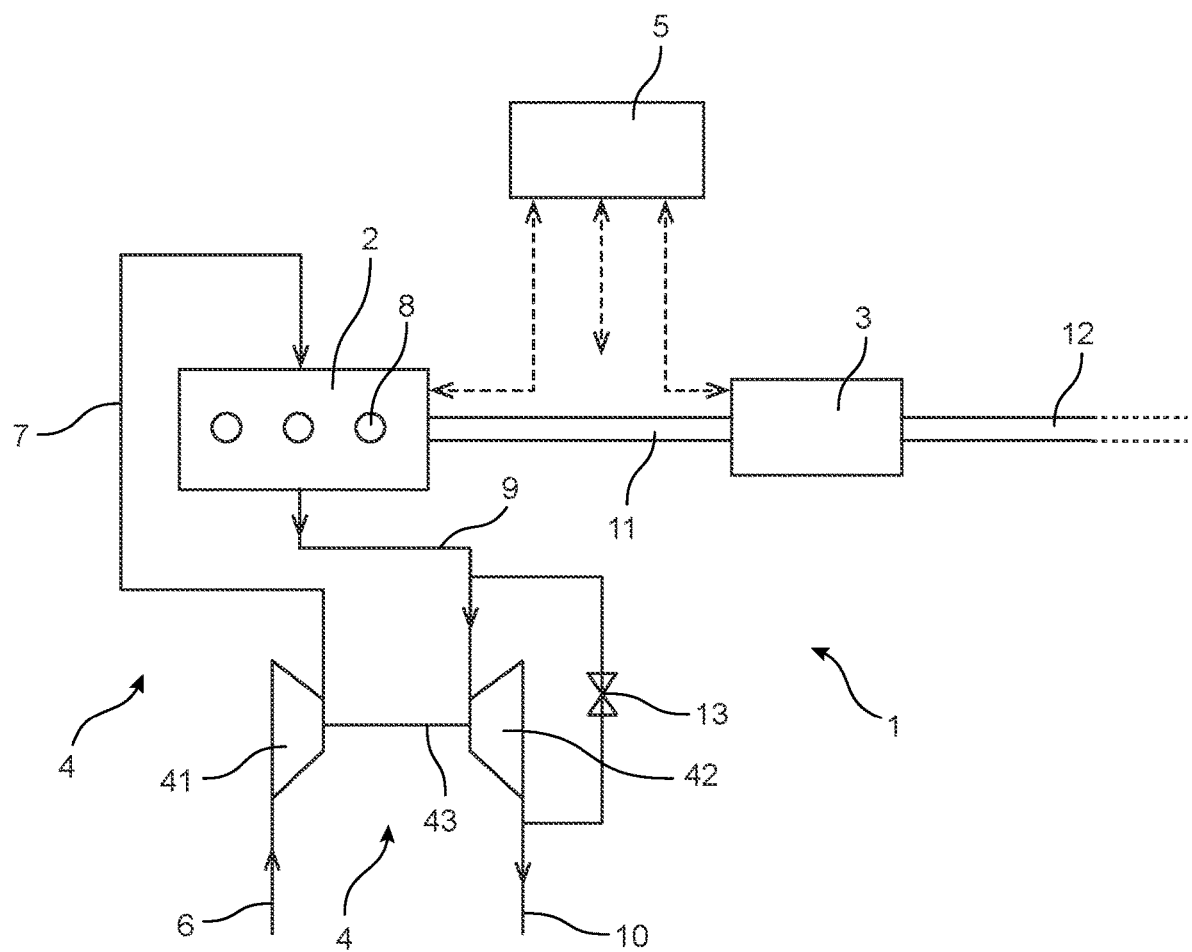
FIG. 2 shows, in a schematic view, an example of an internal combustion engine system according to this disclosure.

FIG. 2 shows a schematic example of an internal combustion engine system 1 comprising the internal combustion engine 2 and a gearbox 3 operatively connected to the internal combustion engine 2; a turbocharging arrangement 4 configured to provide a boost pressure of air fed to the internal combustion engine 2; and a control system 5 configured to control operation of the internal combustion engine system 1.

The turbocharging arrangement 4 comprises a turbo compressor 41 and a turbine 42 connected by a shaft 43. Intake air 6 is fed to the engine 2 via compressor 41 and intake duct 7. The engine 2 comprises a plurality of cylinders 8, each being provided with a piston, valves, fuel injector, etc. (not shown). Exhaust gas from the cylinders 8 leaves passes through exhaust duct 9 via turbine 42 and leaves the engine system at point 10 (after having passed a not shown exhaust gas aftertreatment system). The exhaust gas drives the turbine 42 which, via shaft 43, in turn drives the turbo compressor 41 that increase the pressure of the incoming air and thus provides a boost pressure of the intake air fed through duct 7 to the engine 2.

A wastegate valve 13 is arranged to allow exhaust gas to bypass the turbine 42.

The engine pistons are connected so as to drive a crankshaft 11 that is connected to the gearbox 3. Driving power from the crankshaft 11 is transferred via the gearbox 3 to a drive shaft 12 that is operatively connected to driving wheels of the vehicle 100.

The control system 5 is configured to control the entire system 1 including, for instance, engine torque, the wastegate valve 13, gearshift in the gearbox 2, and a lot more as mentioned further above, such as being configured to carry out the method of this disclosure.

The engine system 1 may include a large number of additional components and functions not shown or mentioned here.

Figure 3:
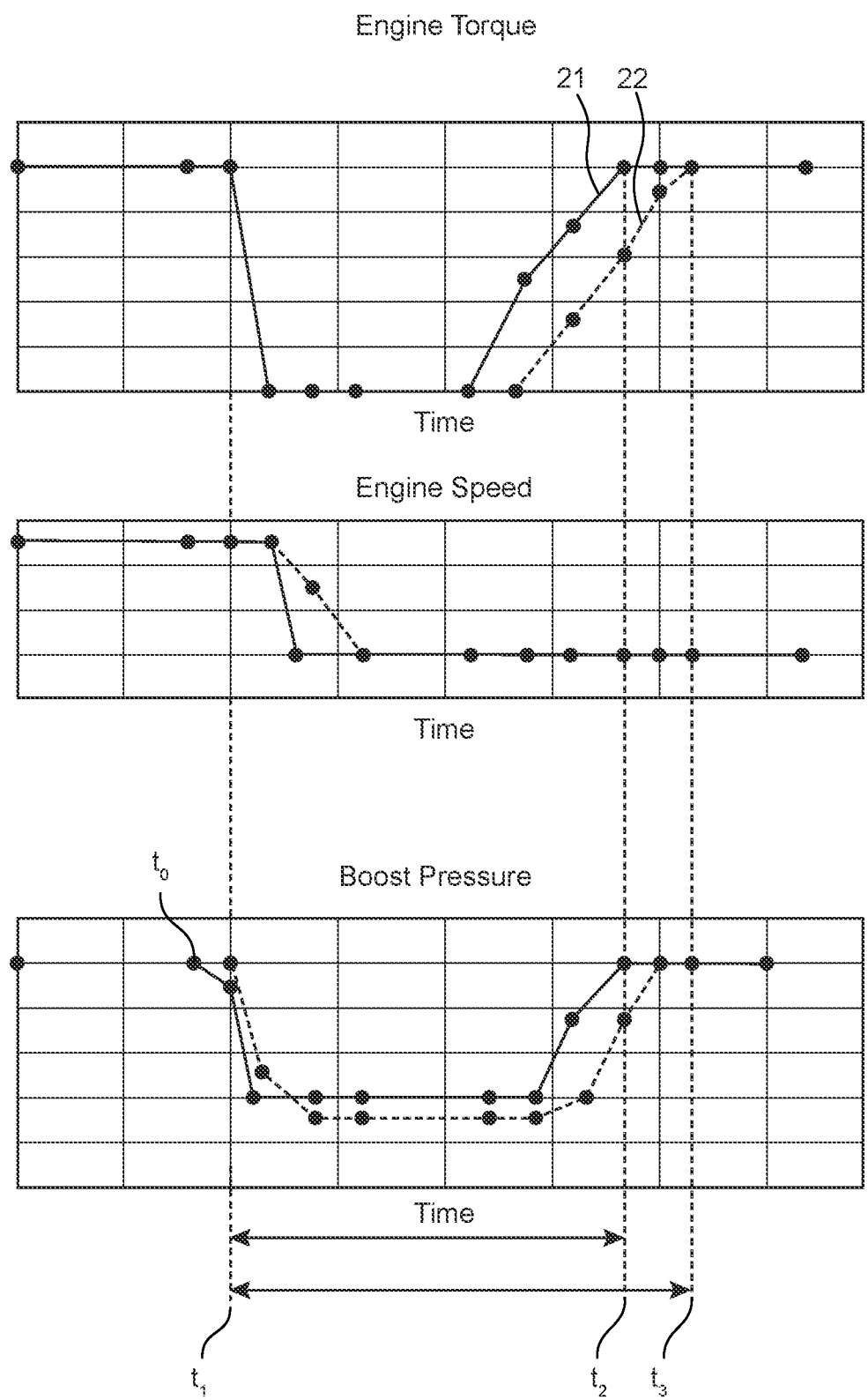
FIG. 3 shows, in a schematic view, how engine torque, engine speed and boost pressure vary with time when gearshift is performed according to the method of this disclosure compared to when another method is used.

FIG. 3 shows how engine torque, engine speed and boost pressure vary with time when gearshift is performed according to the method of this disclosure (solid line 21) compared to when a conventional method is used (dashed line 22).

As shown in FIG. 3, gearshift is initiated at a point of time $t_1$, i.e. reduction of the engine torque is started at $t_1$, see the upper diagram of FIG. 3. The rate of change of the engine torque at $t_1$, i.e. how steep the slope of the line is after $t_1$, may differ between e.g. different engine systems. After some time of delay the engine speed decreases at some rate to a target engine speed to be used after the gearshift, see the middle diagram in FIG. 3. When the gear has been shifted, the engine torque is increased to a target engine torque to be used after the gearshift. As exemplified in FIG. 3, this target engine torque may be the same as before the gearshift. The boost pressure varies in time in a similar way as the engine torque, i.e. it goes down in the beginning of the gearshift procedure and it goes up at the end of the gearshift procedure, see the lower diagram of FIG. 3.

The gearshift is controlled by the control system 5, which e.g. for instance may include a gearbox control circuitry and an engine control circuitry capable of communicating with each other, and which can be structured and be operating in different ways as described previously.

A power cut off period during gearshift can be seen as the period from initiation of the gearshift, $t_1$, to a point in time where the engine torque has reached its target engine torque to be used after the gearshift. As can be seen in FIG. 3, this point in time where the gearshift is completed corresponds to $t_2$ for the method of this disclosure and to $t_3$ for a conventional gearshift method. The time period $t_1$-$t_2$ is shorter than $t_1$-$t_3$, which means that the gearshift power cut off period is shorter for the method of this disclosure than for a conventional method.

In the conventional method, i.e. the dashed line in FIG. 3, it can be seen that the boost pressure starts to decrease at $t_1$ when the engine torque ramp-down starts. In contrast, in the method of this disclosure the boost pressure is proactively reduced (if needed to avoid risk for turbo surge) at a point $t_0$ prior to $t_1$ and thus before initiating the upcoming gearshift. The time between $t_0$ and $t_1$ may be one or a few seconds, or fractions of a second.

As shown in FIG. 3, reducing the boost pressure before starting the gearshift procedure has the effect that it provides for a faster control of the engine speed, i.e. it takes less time to reach the target engine speed (see middle diagram of FIG. 3). Further, it provides for keeping the boost pressure at a higher level during the actual gearshift without risking turbo surge (see lower diagram in FIG. 3). The higher level of boost pressure in turn has the effect that it provides for a faster (earlier) increase of the engine torque, i.e. a faster (earlier) engine torque ramp up, after the gearshift (see upper diagram of FIG. 3). General effects are thus elimination or at least reduction of risk for turbo surge as well as shortened power cut off period during gearshift.

A method for controlling the internal combustion engine system 1 so as to avoid turbo surge and/or shorten power cut off during gearshift, may comprise:

S1—providing information about i) a point of time ($t_1$) for initiating an upcoming gearshift, ii) a target engine speed after the upcoming gearshift, iii) a target engine torque after the upcoming gearshift, and iv) current operation conditions of the internal combustion engine system 1;

S2—determining, based on said information and before the upcoming gearshift is initiated, whether there is a risk of having turbo surge during the upcoming gearshift; and, if such a risk is determined, S3—lowering the boost pressure before initiating the upcoming gearshift.

S1 may, for instance, be carried out in the following way: The control system 5, or a gearbox control circuitry, determines that a gearshift is desired to minimize fuel consumption for a given target speed of a vehicle onto which the internal combustion engine system is arranged. The target speed may be the same as the current speed before the gearshift but information about a change in road inclination obtained from road map information together with GPS data about the current vehicle position may suggest that a higher gear (lower engine speed) should be used. The control system 5 then determines the point of time for initiating the upcoming gearshift ($t_1$) based on a point in time when it was determined that a gearshift is desired. The control system 5 further determines the target engine speed and the target engine torque based on the target speed and on a transmission ratio of the gear to be shifted to in the upcoming gearshift (e.g. a transmission ration between crank shaft 11 and drive shaft 12 with reference to FIG. 2). The control system 5 also considers current operation conditions of the internal combustion engine system 1 (vehicle speed, engine speed and torque, boost pressure, gear in use, etc.).

S2 may, for instance, be carried out in the following way: The control system 5 determines current pressure and flow conditions over the turbo compressor 41 and then compares whether a position in a compressor map corresponding to the current pressure and flow conditions over the compressor 41 is closer to a surge line in the compressor map than a threshold value. If so, it is determined that there is a risk of having turbo surge during the upcoming gearshift. Alternative ways of determining whether there is such a risk include setting a threshold boost pressure for a given change rate of engine torque or engine speed during gearshift or above which gearshift is not allowed, and then determine whether a current boost pressure exceeds the threshold boost pressure. This is further described above.

S3 may, for instance, be carried out in the following way: The control system 5 activates one or more air and gas actuators to increase the air/gas flow through or out from the internal combustion engine 2, i.e. in this example the wastegate valve 13 is opened so that at least a part of the exhaust gas flow bypasses the turbine 42. This increases the outgoing flow of exhaust gas from the engine 2 and reduces the speed of the turbo compressor 41. All in all it lowers the boost pressure. In the example of FIG. 3, S3 is started at to and is continued until the gearshift is initiated at $t_1$.

The method may also comprise initiating the upcoming gearshift and performing the upcoming gearshift. The gearshift procedure is finished at $t_2$.

Any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A method for controlling an internal combustion engine system so as to avoid turbo surge and/or shorten power cut off during gearshift, wherein the internal combustion engine system comprises:
   an internal combustion engine and a gearbox operatively connected to the internal combustion engine;
   a turbocharging arrangement configured to provide a boost pressure of air fed to the internal combustion engine; and
   a control system configured to control operation of the internal combustion engine system, the method comprising:
   providing information about i) a point of time for initiating an upcoming gearshift, ii) a target engine speed after the upcoming gearshift, iii) a target engine torque after the upcoming gearshift, and iv) current operation conditions of the internal combustion engine system;

determining, based on said information and before the upcoming gearshift is initiated, whether there is a risk of having turbo surge during the upcoming gearshift; and, if such a risk is determined, lowering the boost pressure before initiating the upcoming gearshift.

2. The method of claim 1, wherein providing information about the point of time for initiating the upcoming gearshift comprises:

determining that a gearshift is desired, and providing the point of time for initiating the upcoming gearshift based on a point in time when it was determined that a gearshift is desired.

3. The method of claim 1, wherein the method comprises:

determining which gear to use to minimize fuel consumption after the upcoming gearshift based on current conditions and a target speed of a vehicle onto which the internal combustion engine system is arranged.

4. The method according to claim 1, wherein the method comprises:

determining the target engine speed and the target engine torque based on a target speed of a vehicle onto which the internal combustion engine system is arranged and on a transmission ratio of the gear to be shifted to in the upcoming gearshift.

5. The method according to claim 1, wherein the current operation conditions of the internal combustion engine system comprises at least one of the following: current boost pressure, current engine speed and current engine torque.

6. The method according to claim 5, wherein the current operation conditions of the internal combustion engine system comprises the current boost pressure.

7. The method according to claim 1, wherein determining whether there is a risk of having turbo surge during the upcoming gearshift comprises:

determining current pressure and flow conditions over a turbo compressor in the turbocharging arrangement, and comparing whether a position in a compressor map corresponding to the current pressure and flow conditions over the turbo compressor is closer to a surge line in the compressor map than a threshold value.

8. The method according to claim 1, wherein determining whether there is a risk of having turbo surge during the upcoming gearshift comprises:

providing a first threshold boost pressure for a given change rate of engine torque or engine speed during gearshift, or providing a second threshold boost pressure above which gearshift is not allowed, and determining whether a current boost pressure exceeds the first and/or second threshold boost pressure.

9. The method according to claim 1, wherein lowering the boost pressure of the engine system before initiating the upcoming gearshift comprises:

activating one or more air and gas actuators to increase the air/gas flow through the internal combustion engine system.

10. The method according to claim 1, wherein the method comprises:

initiating the upcoming gearshift.

11. The method according to claim 1, wherein the method comprises:

performing the upcoming gearshift.

12. An internal combustion engine system comprising:

an internal combustion engine and a gearbox operatively connected to the internal combustion engine;

a turbocharging arrangement configured to provide a boost pressure of air fed to the internal combustion engine; and a control system configured to control operation of the internal combustion engine system, wherein the control system is configured to perform the method according to claim 1.

13. A vehicle comprising an internal combustion engine system according to claim 12.

14. A computer program product comprising program code for performing, when executed by the processor device, the method of claim 1.

15. A control system comprising one or more control units configured to perform the method of claim 1.

16. A non-transitory computer-readable storage medium comprising instructions, which when executed by the processor device, cause the processor device to perform the method of claim 1.

* * * * *